Patented Sept. 4, 1945

2,384,270

UNITED STATES PATENT OFFICE 2,384,270

COATING COMPOSITIONS AND PROCESS FOR PREPARING THEM

Ladislaus Balassa, Flint, Mich., assignor to E. I. du Pont de Nemours & Company, Wilmington, Del., a corporation of Delaware No Drawing. Application June 9, 1942, Serial No. 446,350

19 Claims. (Cl. 260—22)

This invention relates to coating compositions containing certain combinations of pigment wetting and dispersing agents and more particularly to a process for incorporating such agents in order to obtain coating compositions which are exceptionally stable, flow well, and tolerate relatively large quantities of water.

A great many agents and combinations of agents have been used in the past to decrease the settling tendencies and improve the dispersion of pigments in coating compositions. Small quantities of water have also been frequently employed to reduce the settling and to increase the viscosity of paint compositions containing organic binders and organic solvents. The introduction of water, however, resulted, as a rule, in the formation of relatively unstable water-in-oil type emulsions and in the flocculation of the pigments. Paint compositions based on oleo-resinous binders and containing a low percentage of water have, as a rule, pronounced thixotropic properties which, while helpful in reducing the settling tendencies of the pigments are undesirable in paints particularly those intended for dip application, i. e., paints which must have good flowing and levelling properties.

It has been generally considered true in the art that agents which increase the wetting and the dispersion of heavy pigments also correspondingly increase their tendency to settle out in a hard pigment cake while "anti-settling agents" are effective only in compositions where flocculation of the pigment occurs. An example is a dispersion of blanc fixe in a vehicle consisting of limed rosin and kettle bodied linseed oil (G. H. Body Z-4). When a dispersed composition of the above type is adjusted to a pigment/binder ratio of around 100/100 by weight and then reduced with mineral spirits to a solids content of around 40% by weight, and then stored for a few hours the blanc fixe settles out to a firm sediment which will become increasingly hard on prolonged storage. If a wetting agent like a low percentage of a gilsonite solution is added to the above composition, the blanc fixe will settle out within a very few minutes to a dense hard pigment cake which is very difficult to reincorporate into the vehicle. On the other hand, if an anti-settling agent is introduced such as water or Turkey red oil, the blanc fixe will flocculate forming a soft, voluminous sediment which can be stirred up with ease. A product having an excessively flocculated sediment which is lacking in flowing and levelling properties, such as results from the above water or Turkey red oil treatment, is considered equally unsatisfactory as a product from which the pigments settle out to a hard cake.

This invention has as an object the production of paint compositions with free flowing and good levelling properties.

A further object is the production of paint compositions containing inert extenders of high specific gravity, which when reduced to low viscosities will not form hard pigment sediments.

A still further object is the production of oleoresinous paint compositions, forming stable blends with water, in which at least part of the pigment composition is of a hydrophyllic nature.

Another object is the production of paint compositions based on organic vehicles which are miscible with relatively large quantities of water without acquiring the characteristics of emulsions.

Other objects will appear hereinafter as the description of the invention proceeds.

These objects are accomplished by dispersing in a paint composition first a small percentage i. e., .2 to 10% of a drying oil acid and an equal amount of an air blown drying oil and following this by dispersing in said composition a quantity of water approximately equal to twice the combined weight of the drying oil acid and the blown oil i. e., .8 to 40% based on the weight of the pigment. The above ingredients are dispersed by grinding them in ball mills at elevated temperatures, into the said paint compositions. The products thus obtained are stable and the pigments remain well dispersed in the vehicle without forming a hard sediment even after prolonged storage, and are compatible with up to equal weight of water without adverse effects on the flow, dispersion and non-settling properties.

Hydrophyllic pigments dispersed in organic vehicles will flocculate in the presence of relatively small quantities of water. If hydrophobic pigments, which are ordinarily resistant against flocculation by water, are dispersed in organic vehicles in combination with hydrophyllic pigments, introduction of water will, as a rule, flocculate both the hydrophyllic and the hydrophobic pigments. For instance, if carbon black, a hydrophobic pigment, is dispersed with blanc fixe, a hydrophyllic pigment in a 20 gallon ester gum-bodied linseed oil vehicle and then .5 to 5% water is mixed or ground into the same composition, a complete flocculation of both pigments will take place. The flocculation manifests itself in the usual manner, i. e., by the formation of a voluminous sediment, lack of flowing and levelling properties and by the flocculated appearance of the flowed-out films.

I have found that paint compositions consisting of an oleo-resinous vehicle like a 20 gallon ester gum-bodied linseed oil varnish and pigmented with either only hydrophyllic pigments or with a combination of hydrophyllic and hydrophobic pigments can be prevented from flocculating in the presence of relatively large quantities of water by dispersing with each 100 parts of the pigment combination about 1.2 parts of linseed oil fatty acids, 1.2 parts of an air blown linseed oil and 4.8 parts water.

In practicing my invention I first load a ball mill with the pigment and the vehicle in the ratio of about 32 pounds of binder to each 100 pounds of pigment, plus sufficient solvent to result in the proper grinding consistency. I then add the required amounts of linseed oil fatty acids and blown linseed oil and then proceed to grind the composition at around 150° F. mill base temperature until the desired degree of pigment dispersion is obtained. I then introduce the water and continue the grind at around 150° F. until the water is completely dispersed in the composition. I usually obtain a satisfactory dispersion by continuing the grind for about 20% longer, calculated on the grinding cycle preceding the introduction of the water.

The following examples of typical compositions are included by way of illustration and not as a limitation:

EXAMPLE I

Dipping primer

| | Parts by weight |
|---|---|
| Varnish "A" | 37.93 |
| Linseed oil acids | .50 |
| Blown linseed oil | .50 |
| Iron naphthenate | .28 |
| Finely ground barytes | 37.05 |
| Finely ground talc | 2.80 |
| Carbon black | 2.80 |
| Mineral spirits | 16.11 |
| Water | 2.03 |
| | 100.00 |

Varnish "A" was formed from the following ingredients using the proportions indicated:

| | |
|---|---|
| Ester gum | 27.0 |
| Bodied linseed oil | 43.6 |
| Mineral spirits | 29.4 |
| | 100.0 |

The linseed oil used in Varnish "A" was heat treated to a body of Gardner-Holdt Z4 before adding the ester gum.

EXAMPLE II

Dipping primer

| | Parts by weight |
|---|---|
| Varnish "B" | 38.00 |
| Linseed oil acids | .50 |
| Blown linseed oil | .50 |
| Iron naphthenate | .30 |
| Blanc fixe | 39.85 |
| Carbon black | 2.80 |
| High solvency petroleum naphtha | 16.00 |
| Water | 2.05 |
| | 100.00 |

Varnish "B" was formed from the following ingredients using the proportions indicated:

| | |
|---|---|
| Ester gum | 27.0 |
| Dehydrated castor oil | 43.6 |
| Mineral spirits | 29.4 |
| | 100.0 |

The dehydrated castor oil used in Varnish "B" was heat treated to "string" before adding the ester gum.

The linseed oil acids used in the above examples had the following specifications:

| | |
|---|---|
| Acid number | 204 |
| Iodine number (Wijs) | 171 |
| Saponification number | 199 |

The blown linseed oil was prepared by blowing alkali refined linseed oil with air at 219° F. until Gardner-Holdt body "Y" was obtained.

The barytes and the talc used in Example I were ground to an average particle size of 5 microns before incorporating them into the composition. In Examples I and II the pigment was ground in ball mills with steel balls at a grinding temperature of 150° F. The mills were loaded in accordance with customary practice, the mill base consistency was adjusted to a consistency permitting free movements to the steel balls. The mills were rotated at a rate of 1,400 revolutions per hour. The mill bases of both Examples I and II were ground without water for 40,000 revolutions then the water was introduced and the grinding continued for an additional 10,000 revolutions after which the remainder of the composition was introduced. I prefer to use ball or pebble mills for the dispersion of the coating compositions falling within the scope of the present invention. I have found that I can obtain an even dispersion of both the pigments in the vehicle and the water in the mill base by grinding first the pigments into the vehicle in the presence of the linseed oil acids and of the blown linseed oil, introducing the water only in the last 20% of the grinding cycle. I have also found that a grinding temperature of between 140° and 160° F. is the optimum for dispersing the above compositions. Products ground at between 60° and 80° F. have a somewhat flocculated appearance and, therefore, can be used only where appearance is not of importance, it is possible however to obtain products with satisfactory appearance and working properties at between 80 and 120° F. Most satisfactory dispersion, i. e., freedom from flocculated appearance, good flow and stability in the presence of water are obtained only when the grinding is done at temperatures above 120° F.

Where desired, other finely ground extenders or prime pigments such as silica, calcite, asbestine, titanium dioxide, china clay, lamp black, iron oxide, etc. may be incorporated in the coating compositions falling within the scope of the present invention.

Varnish "A" and "B" referred to above, or other oleo-resinous vehicles may be made by any suitable manner known to the art, for example, by bodying the oils rapidly at high temperatures around 600° F. or bodying them more slowly at lower temperatures. The oils may be bodied either in the presence or absence of driers. They may also be blown, during part or the entire length of the heat treatment, by either an inert gas like $CO_2$ or by an oxidizing gas like air or oxygen, in order to accelerate the polymerization of the oil or to remove the products of decomposition formed during the bodying of the oil. The oils used in the vehicles may be of the drying oil type, like linseed, soy bean, tung, perilla, menhaden, chia and oiticica oils or they may be of the semi-drying type like cottonseed and sunflower seed oils or processed oils like dehydrated castor oil or synthetic oils. The resins used in compositions, falling within the scope of the present invention, include natural resins like rosin, Congo, East India, damar, etc., or synthetic and semi-synthetic resinous products like alkyd resins, phenolformaldehyde condensation products, ester gum, chlorinated rubber and compounds used as plasticizers with the above resins.

The term "fatty acids" is used herein to denote the acids obtained through the saponification of either drying, semi-drying or non-drying oils, as well as most fats of animal and vegetable origin. The fatty acids falling under the scope of the present invention include oil acids like linoleic, linolenic, oleostearic, oleic, lauric, as well as acids obtained from solid fats like stearic and palmitic acids. Naphthenic acids are also effective and fall under the scope of the present invention.

The term "blown oil" is used herein to denote the product obtained by blowing drying or semi-drying oils with air, at temperatures below 300° F., until a very substantial increase in the body results. It is important that the oils should not be blown to the "jell" point or even to the point where they lose their solubility in hydrocarbon solvents. While I prefer to use linseed oil blown with air at 220° F. to Gardner-Holdt body "Y," other blown oils obtained by blowing a variety of drying and semi-drying oils were found useful and fall under the scope of the present invention.

In some combinations it is possible to use one of the lower alcohols like ethyl or methyl alcohol, in place of part or all of the water in the composition. Using alcohols I obtained uniform dispersions at somewhat lower grinding temperatures than necessary for the dispersion with water. From a theoretical viewpoint these compounds may be described as having a chemical formula: $R-OH$, where $R$ is $H$, $CH_3$ or other lower alkyl group.

Paint compositions treated in accordance with my invention will not cake or form hard pigment sediment, even after prolonged storage. The flowing properties of products applied by dipping or flowing are much improved over conventional dipping primers. The opacity of the products is frequently increased by the treatment.

Compositions treated in accordance with my invention are compatible with water in the sense that relatively large quantities of water can be incorporated into them by simple stirring. Such products, containing up to or even beyond equal weight of water on the basis of the original compositions, are smooth and uniform in appearance and stable even after prolonged storage.

My invention makes it possible to incorporate water solutions of inorganic or organic compositions into organic paint compositions without appreciably affecting the working properties or appearance of the resulting products. It should be noted, however, that stable blends with water solutions are obtained only if such solutions are either neutral or basic in nature, i. e., of pH 7 or above. Increasingly unstable blends are obtained if the pH of the water solution is below 7, i. e., on the acid side. By keeping the pH of the water solution around or above 7 it is possible to make stable blends with compositions prepared in accordance with my invention and with solutions of sodium silicates, sodium or ammonium phosphates, sodium or ammonium chromates, etc., and thereby obtain unusual film properties, corrosion resistance or other properties without materially altering the appearance and working properties of the products.

It is apparent that many widely different embodiments of this invention may be made without departing from the spirit and scope thereof, and therefore, it is not intended to be limited except as indicated in the appended claims.

I claim:

1. The process of preparing coating compositions which comprises grinding a pigment in a water insoluble resinous vehicle, a substantial part of the pigment being a hydrophillic pigment, adding thereto approximately equal parts of from .2 to 10% of an oil acid and from .2 to 10% of a blown oil, thereafter adding from .8 to 40% of a compound having the formula $R-OH$ where $R$ is selected from the group consisting of hydrogen and the lower alkyl groups having less than 3 carbon atoms, the said percentages being based on the weight of dry pigment, and continuing the grinding until the mass is homogeneous.

2. The process of claim 1 in which the pigment is dispersed in the vehicle at a temperature between about 120° F. and 220° F.

3. The process of claim 1 in which water is added to the pigment-vehicle mixture.

4. The process of claim 1 in which methyl alcohol is added to the pigment-vehicle mixture.

5. The process of claim 1 in which ethyl alcohol is added to the pigment-vehicle mixture.

6. The process of claim 1 in which the pigment and vehicle are ground in a ball mill for about 40,000 revolutions and thereafter the $R-OH$ compound is added and the grinding continued for about 10,000 revolutions.

7. The process of claim 1 in which the resinous vehicle is an oleoresinous vehicle.

8. The process of claim 1 in which the resinous vehicle contains an alkyd resin.

9. The process of claim 1 in which the oil acid is naphthenic acid.

10. The process of claim 1 in which the oil acid is an acid of linseed oil.

11. A coating composition comprising a water insoluble resinous vehicle, a pigment, from .2 to 10% of an oil acid, from .2 to 10% of a blown oil, the oil acid and blown oil being present in about equal parts, and from .8 to 40% of a compound having the formula $R-OH$ where $R$ is selected from the group consisting of hydrogen and the lower alkyl groups having less than 3 carbon atoms, said percentages being based on the dry pigment.

12. The composition of claim 11 in which the vehicle contains an oil having drying properties.

13. The composition of claim 11 in which the vehicle contains an alkyd resin.

14. The composition of claim 11 in which the oil acid is a fatty acid.

15. The composition of claim 11 in which the oil acid is naphthenic acid.

16. The composition of claim 11 in which the $R-OH$ compound is water.

17. The composition of claim 11 in which the $R-OH$ compound is methyl alcohol.

18. The composition of claim 11 in which the $R-OH$ compound is ethyl alcohol.

19. A paint composition comprising an alkyd resin vehicle, a pigment comprising carbon black, barytes, and talc, about 1.17% of linseed oil acids, 1.17% of blown linseed oil, and about 4.75% of water based on the weight of the dry pigment.

LADISLAUS BALASSA.